US007542832B2

(12) United States Patent
Nou

(10) Patent No.: US 7,542,832 B2
(45) Date of Patent: Jun. 2, 2009

(54) VEHICLE MANAGEMENT SYSTEM AND METHOD IN TELEMATICS SYSTEM

(75) Inventor: Seong Taeg Nou, Icheon-shi (KR)

(73) Assignee: Hyundai Autonet Co., Ltd., Icheon-Shi, Kyunki-do (KR)

( * ) Notice: Subject to any disclaimer, the term of this patent is extended or adjusted under 35 U.S.C. 154(b) by 427 days.

(21) Appl. No.: 11/428,285

(22) Filed: Jun. 30, 2006

(65) Prior Publication Data

US 2007/0050126 A1 Mar. 1, 2007

(30) Foreign Application Priority Data

Aug. 23, 2005 (KR) ...................... 10-2005-0077146

(51) Int. Cl.
*G01M 17/00* (2006.01)

(52) U.S. Cl. ......................... 701/29; 701/30; 340/425.5

(58) Field of Classification Search .................. 701/29, 701/30; 340/425.5
See application file for complete search history.

(56) References Cited

U.S. PATENT DOCUMENTS

| | | | | |
|---|---|---|---|---|
| 6,678,591 | B2 * | 1/2004 | Ohmura et al. | 701/29 |
| 7,374,003 | B1 * | 5/2008 | Fernandez | 180/65.8 |
| 7,395,072 | B2 * | 7/2008 | Gudmundsson et al. | 455/456.1 |
| 2004/0192348 | A1 * | 9/2004 | Gudmundsson et al. | 455/456.1 |
| 2005/0065711 | A1 * | 3/2005 | Dahlgren et al. | 701/117 |
| 2005/0137757 | A1 * | 6/2005 | Phelan et al. | 701/1 |
| 2006/0211446 | A1 * | 9/2006 | Wittmann et al. | 455/552.1 |
| 2006/0271246 | A1 * | 11/2006 | Bell et al. | 701/1 |
| 2008/0128186 | A1 * | 6/2008 | Fernandez | 180/65.1 |

FOREIGN PATENT DOCUMENTS

| | | |
|---|---|---|
| JP | 2005-355094 | 12/2004 |
| JP | 2005-128681 | 5/2005 |
| JP | 2005-130079 | 5/2005 |
| JP | 2005-130080 | 5/2005 |
| JP | 2005-2236468 | 8/2005 |
| JP | 2005-3456623 | 12/2005 |
| KR | 1020040034116 | 4/2004 |
| KR | 1020040039829 | 5/2004 |
| KR | 1020050013001 | 2/2005 |
| KR | 1020050083530 | 8/2005 |

* cited by examiner

*Primary Examiner*—Mark Hellner
(74) *Attorney, Agent, or Firm*—IPLA P.A.; James E. Bame

(57) ABSTRACT

A vehicle management system and method in a telematics system. The vehicle management system includes: a telematics terminal for measuring a vehicle state at each first period, accumulating and storing the measured vehicle state during a second period, and transmitting accumulated and stored accumulation vehicle state information; and a telematics center connected with the telematics terminal, and receiving the accumulation vehicle state information from the telematics terminal, storing the received accumulation vehicle state information, checking a variation progress of state values of each vehicle part of the received accumulation vehicle state information and searching for corresponding diagnosis information, and generating and transmitting vehicle management information to the telematics terminal.

20 Claims, 6 Drawing Sheets

VEHICLE MANAGEMENT SYSTEM AND METHOD IN TELEMATICS SYSTEM

BACKGROUND OF THE INVENTION

1. Field of the Invention

The present invention relates to a telematics system, and more particularly, to a vehicle management system and method in a telematics system, for cyclically checking various vehicle states, accumulating and recording the checked vehicle state in a telematics center, analyzing accumulated and recorded vehicle state information, diagnosing a vehicle, and informing a driver of a diagnosis result.

2. Description of the Related Art

In Korean patent application No. 10-2004-0101549 filed on Dec. 4, 2004 by this applicant and entitled "remote vehicle diagnosing system using telematics system, and control method thereof" (Hereinafter, referred to as "earlier filed invention"), there is provided a system for diagnosing a state of a remote vehicle using a remote communication terminal such as a computer or a portable digital assistants (PDA), and a control method thereof.

In detail, the remote vehicle diagnosing system includes a communication terminal for, upon reception of a remote diagnosis service request from a user, generating and transmitting a remote diagnosis service request signal, and upon transmission of vehicle diagnosis information in response to the remote diagnosis service request signal, informing the user of the transmission of the vehicle diagnosis information; a service providing center for receiving the remote diagnosis service request signal and transmitting a remote diagnosis request signal, and upon reception of vehicle diagnosis information in response to the remote diagnosis request signal, transmitting the received vehicle diagnosis information to the communication terminal; and a telematics terminal for receiving the remote diagnosis request signal, diagnosing a vehicle state, and generating and transmitting vehicle diagnosis information depending on the diagnosed vehicle state. Accordingly, the system can confirm an opening state of a car door and window, and information on each vehicle part obtained using a sensor, at a remote place.

As described above, the vehicle remote diagnosing system has an advantage in that states of the car door and window and a variety of oils can be detected using the sensor.

However, the vehicle remote diagnosing system has a drawback in that since the vehicle state is diagnosed using only the sensor, it is difficult to diagnose a more detailed vehicle state such as a continuous reduction of vehicle power, thereby making it difficult to prevent weariness or breakdown of the vehicle.

SUMMARY OF THE INVENTION

Accordingly, the present invention is directed to a vehicle management system and method in a telematics system that substantially overcomes one or more of the limitations and disadvantages of the conventional art.

One object of the present invention is to provide a vehicle management system and method in a telematics system, for cyclically checking various vehicle states, accumulating and recording the checked vehicle state in a telematics center, analyzing accumulated and recorded vehicle state information, diagnosing a vehicle, and informing a driver of a diagnosis result.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a vehicle management system in a telematics system connected with a personal communication terminal through an Internet network, the vehicle management system including: a telematics terminal for measuring a vehicle state at each first period, accumulating and storing the measured vehicle state during a second period, and transmitting accumulated and stored accumulation vehicle state information; and a telematics center having a vehicle diagnosis database for storing diagnosis information on states of each vehicle part, and connected with the telematics terminal through a mobile communication network, and receiving the accumulation vehicle state information from the telematics terminal, storing the received accumulation vehicle state information, checking a variation progress of state values of each vehicle part of the received accumulation vehicle state information and searching for corresponding diagnosis information with reference to the vehicle diagnosis database, and generating and transmitting vehicle management information to the telematics terminal.

In another aspect of the present invention, there is provided a vehicle management system in a telematics system connected with a personal communication terminal through an Internet network, the vehicle management system including: a telematics terminal for measuring and storing a vehicle state at each first period, transmitting stored vehicle state information, and receiving and displaying predetermined vehicle management information; and a telematics center having a vehicle diagnosis database for storing diagnosis information on states of each vehicle part, and connected with the telematics terminal through a mobile communication network, and receiving the vehicle state information at each first period from the telematics terminal, accumulating and storing the received vehicle state information during a second period, checking a variation progress of state values of each vehicle part of the received vehicle state information and searching for corresponding diagnosis information with reference to the vehicle diagnosis database, and generating and transmitting vehicle management information to the telematics terminal.

In a further aspect of the present invention, there is provided a vehicle management method in a telematics system having a telematics terminal, a telematics center connected with the telematics terminal through a mobile communication network and having a vehicle diagnosis database for storing diagnosis information on states of each vehicle part, and a personal communication terminal connected with the telematics terminal through an Internet network, the method including: a first step of, in the telematics terminal, measuring a vehicle state at each first period, accumulating and storing the measured vehicle state during a second period, and transmitting accumulated and stored accumulation vehicle state information; a second step of, in the telematics center connected with the telematics terminal through a mobile communication network, receiving the accumulation vehicle state information from the telematics terminal, storing the received accumulation vehicle state information, checking a variation progress of state values of each vehicle part of the received accumulation vehicle state information and searching for corresponding diagnosis information with reference to the vehicle diagnosis database, and generating and transmitting vehicle management information to the telematics terminal;

and a third step of, in the telematics terminal, receiving and displaying the vehicle management information.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
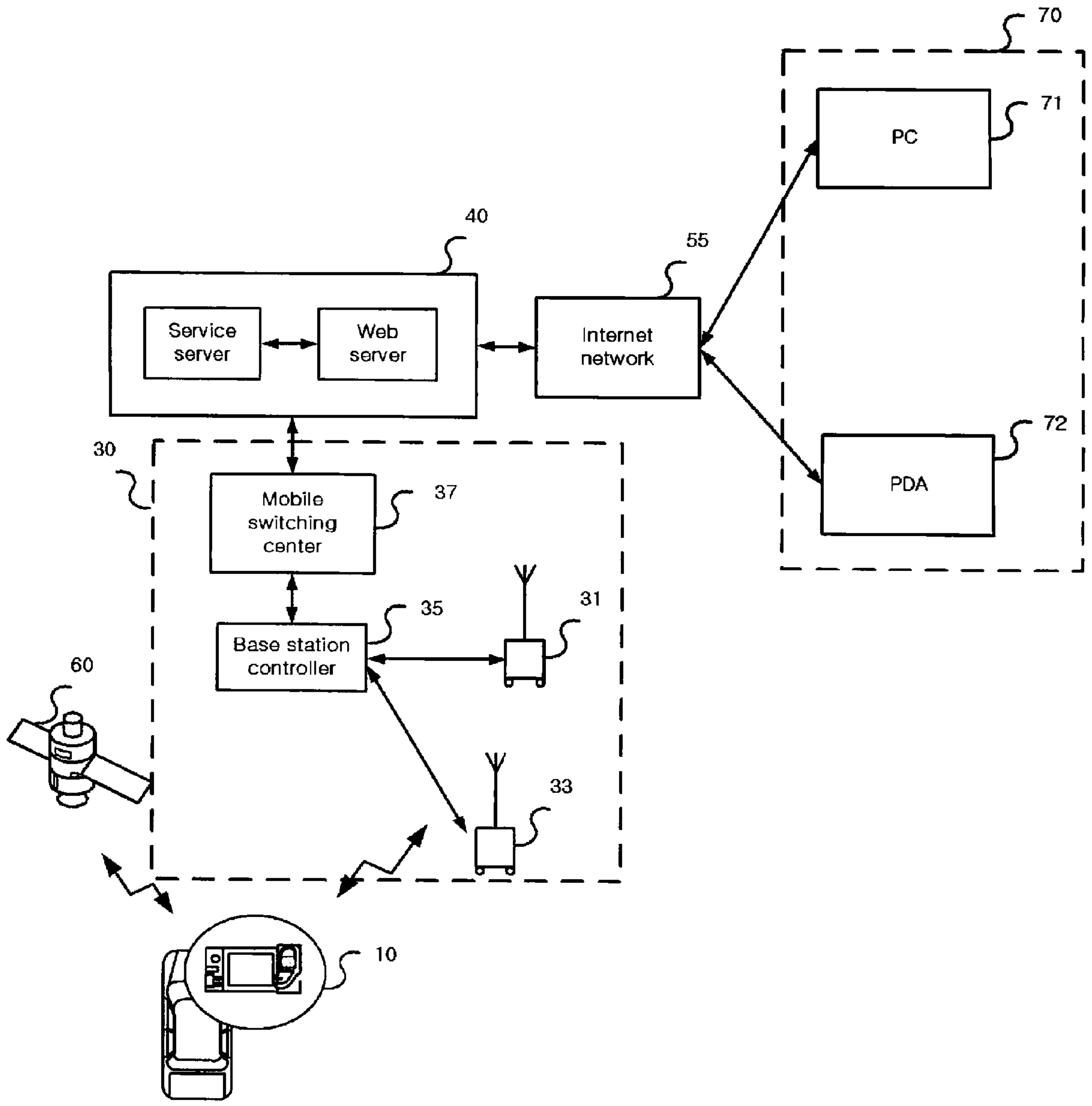
FIG. 1 illustrates a construction of a vehicle management system in a telematics system according to the present invention.

Reference will now be made in detail to the preferred embodiments of the present invention, examples of which are illustrated in the accompanying drawings. Wherever possible, the same reference numerals will be used throughout the drawings to refer to the same or like parts.

In the present invention, a telematics terminal of a telematics system measures a vehicle state at a predetermined cycle, for example, once per a day, accumulates the measured vehicle state for one month, and transmits accumulated vehicle state information to a telematics center at each one month. The telematics center stores detailed diagnosis information on a variety of vehicle states, receives and analyzes the accumulation vehicle state information, searches for and stores corresponding diagnosis information, and transmits the stored diagnosis information to the telematics terminal. Further, the telematics terminal can also allow an expert to confirm the received accumulation vehicle state information, receive diagnosis information on a corresponding vehicle state from the expert, and transmit the received vehicle diagnosis information to the telematics terminal.

Further, in the present invention, the telematics terminal measures the vehicle state at a predetermined cycle, and transmits the vehicle state to the telematics center. The telematics center receives, accumulates and manages the measured vehicle state, analyzes the accumulated vehicle state at a predetermined cycle, searches for and stores the corresponding diagnosis information, and transmits the stored diagnosis information to the telematics terminal.

FIG. 1 illustrates a construction of a vehicle management system in a telematics system according to the present invention.

Referring below to FIG. 1, the inventive vehicle management system of the telematics system includes the telematics terminal 10; a mobile communication network 30 having a plurality of base stations 31 and 33, a base station controller 35, and a mobile switching center 37; the telematics center 40; an Internet network 55; and a personal communication terminal 70 such as a computer 71 and a personal digital assistants (PDA) 72.

The telematics terminal 10 measures the vehicle state, such as an amount of oil, an amount of oil feeding, a mileage, a running speed, and a revolution per minute (RPM), at each period (Hereinafter, referred to as “first period”), for example, at each day, generates and stores vehicle state information on the measured state of each vehicle part, accumulates the vehicle state information at a predetermined period (Hereinafter, referred to as “second period”), for example, for one month, generates a vehicle state information report message including the vehicle state information or the accumulation vehicle state information, at each second period, and transmits the generated vehicle state information report message to the telematics center 40 through the mobile communication network 30.

The telematics center 40 includes a service server 50 for controlling an operation for providing various services to the telematics terminal, and a Web server 43 for performing a data communication with the user communication terminal 70 such as the personal computer (PC) 71 and/or the PDA 72 through the Internet network 55.

The service server 50 includes a diagnosis database (Hereinafter, referred to as “DB”) for storing the diagnosis information on various vehicle states. Upon reception of the vehicle state information report message from the telematics terminal 10 through the mobile communication network 30, the service server 50 detects the vehicle state information or the accumulation vehicle state information from the vehicle state information report message, and stores the detected vehicle state information. In case where the received information is the vehicle state information at each first period, the service server 50 accumulates the received vehicle state information and diagnoses the vehicle state. In case where the received information is the accumulation vehicle state information accumulated for the second period, upon the reception of the accumulation vehicle state information, the service server 50 analyzes the accumulation vehicle state information with reference to the vehicle diagnosis DB, generates and stores vehicle diagnosis information and vehicle countermeasure information, and transmits the stored information to the telematics terminal 10. Further, if it is diagnosed and determined that the vehicle should be instantly repaired, the service server 50 generates and transmits a vehicle repair request message including the vehicle state information, the vehicle diagnosis information, and the vehicle countermeasure information, to the telematics terminal 10. In other words, the vehicle repair request message and a vehicle management message are identical in data, but are different in type.

Further, the service server 50 can also receive a diagnosis result of the accumulation vehicle state information from the vehicle diagnosis expert, and generate and store the vehicle diagnosis information.

The telematics center 40 connects the service server 50 with the Web server 43, and not only provides the vehicle diagnosis information to the telematics terminal 10 but also provides the vehicle diagnosis information to a user who connects to the Web server 43 through the communication terminal 70 such as the computer 71 and the PDA 72.

The user can connect to the Web server 43 of the telematics center 40 even through a home network (not shown), not the Internet network 55, and confirm the vehicle diagnosis information.

Figure 2:
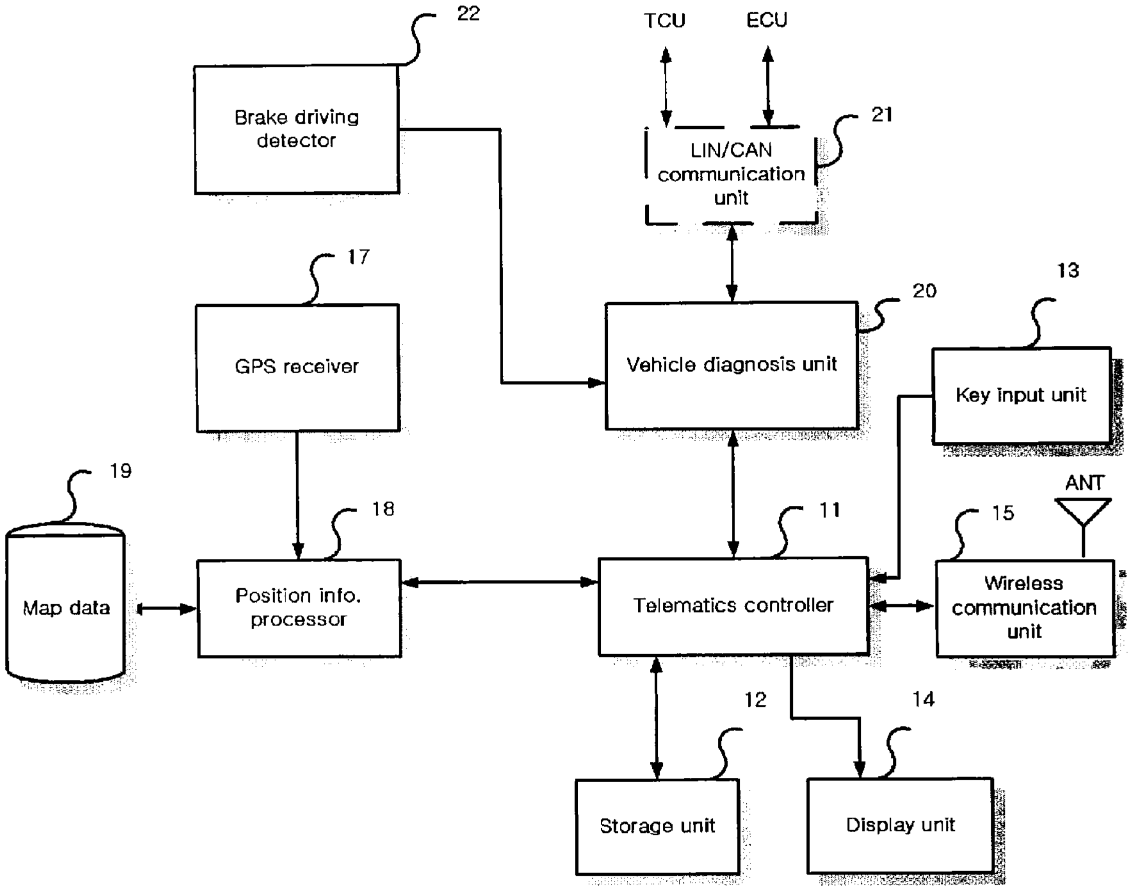
FIG. 2 illustrates a construction of a telematics terminal according to the present invention.

FIG. 2 illustrates a construction of the telematics terminal according to the present invention. A construction and an operation of the telematics terminal 10 according to the present invention will be described with reference to FIG. 2 below.

The telematics terminal 10 includes a telematics controller 11, a storage unit 12, a key input unit 13, a display unit 14, an interface unit 15, a wireless communication unit 16, a global positioning system (GPS) receiver 17, a position information processor 18, a map database 19, a vehicle diagnosis unit 20, a local interconnect network (LIN)/controlled area network (CAN) communication unit 21, and a brake driving detector 22.

The telematics controller 11 controls a general operation of the telematics terminal 10 and particularly, controls an operation for vehicle management according to the present invention.

The storage unit 12 includes an area for storing a control program for controlling the operation of the telematics terminal 10 including a vehicle management operation; an area for temporarily storing data generated during execution of the control program; and an area for storing vehicle state information, vehicle management information, and vehicle repair information.

The key input unit 13 includes a plurality of keys such as a mode key for setting a mode, a search key for searching for a function, data and the like, and a selection key for selecting the searched function and data, and generates key data on a key pressed by the user and outputs the generated key data to the telematics controller 10.

The display unit 14 displays various information such as an operation mode of the telematics terminal under the control of the telematics controller 11, displays text and graphic data based on the mode, and displays the vehicle state information, the vehicle management information, and the vehicle repair information.

The wireless communication unit 15 performs the data communication with the telematics center 40 through the mobile communication network 30 of FIG. 1.

The GPS receiver 17 receives a position signal and an absolute time signal from at least three GPS artificial satellites, respectively.

Under the control of the telematics controller 11, the position information processor 18 receives the position signal and the absolute time signal through the GPS receiver 17, calculates its current position, reads map data of a predetermined area from the map DB 19, performs map matching, receives destination information from the telematics controller 11 to search for a path and match the searched path, and outputs the matched path to the telematics controller 11. Thus, the telematics controller 11 displays the map data on the matched current position and path, on the display unit 14.

The LIN/CAN communication unit 21 performs an optical communication with internal electronic units of the vehicle such as a transmission control unit (TCU) and an electric control unit (ECU) having information such as the RPM, transmission, the running speed, the amount of oil, and the amount of oil feeding.

The brake-driving detector 22 detects a brake press, and outputs a brake press signal and brake press strength information for informing whether or not the brake is pressed, to the vehicle diagnosis unit 20.

The vehicle diagnosis unit 20 communicates with the TCU and the ECU depending on a LIN protocol/CAN protocol through the LIN/CAN communication unit 21, collects and calculates a variety of vehicle states, for example, information on acceleration, the mileage, an amount of fuel consumption, the RPM, and a time-based average running speed, and outputs the calculated information to the telematics controller 11. Further, the vehicle diagnosis unit 20 counts the number of times of the brake press when the brake press signal is received from the brake driving detector 22, calculates a distance (braking distance) and a braking time up to stop, that is, up to a speed of zero when the brake press signal is inputted, and outputs the counted number of times and the calculated braking distance and time to the telematics controller 11 as a part of the vehicle state information.

The telematics controller 11 measures the vehicle state through the vehicle diagnosis unit 20 at a predetermined period, that is, at each first period, generates and stores the vehicle state information constituted of state measurement information of each vehicle part in the storage unit 12, and transmits the stored vehicle state information to the telematics center 40 through the wireless communication unit 15 at a cycle of the second period. The vehicle state information includes an average vehicle running speed, the time-based average running speed, the number of times of the brake press, the braking distance, the amount of fuel consumption per a distance (gas mileage), the acceleration, and the RPM.

Figure 3:
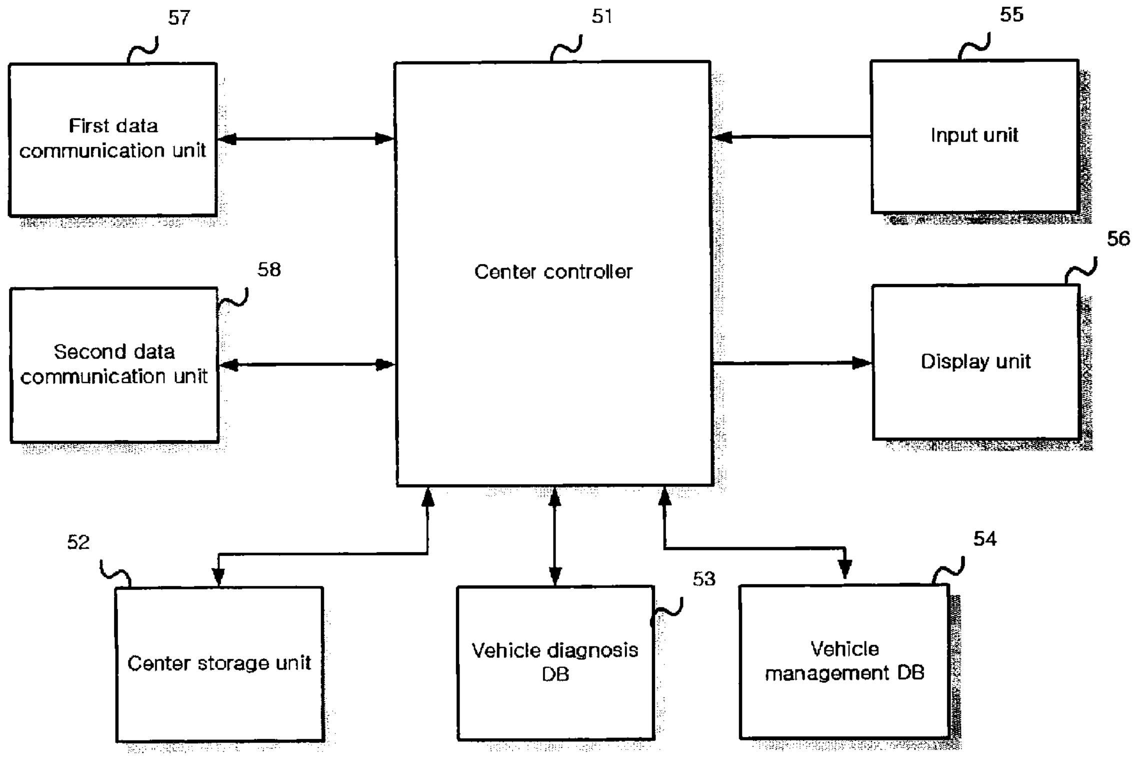
FIG. 3 illustrates a schematic construction of a service server of a telematics center according to the present invention.

FIG. 3 illustrates a schematic construction of the service server of the telematics center according to the present invention. A construction and an operation of the service server according to the present invention will be described with reference to FIG. 3 below.

The service server 50 includes a center controller 51, a center storage unit 52, a vehicle diagnosis DB 53, a vehicle management DB 54, an input unit 55, a display unit 56, a first data communication unit 57, and a second data communication unit 58.

The first data communication unit 57 performs a data communication with the telematics terminal 10 through the mobile communication network 30.

The center storage unit 52 includes an area for storing a control program for controlling a general operation of the service server 50, and an area for temporarily storing data generated during execution of the control program.

The vehicle diagnosis DB 53 stores the diagnosis information on various vehicle states and the vehicle countermeasure information to the diagnosis information. For example, the vehicle diagnosis DB 53 can be defined in such a manner that the diagnosis information is normal at 2,500 RPM, the diagnosis information is an engine or engine coil check needed at 3,000 RPM, and the diagnosis information is an engine and engine coil urgent check needed at excess of 3,000 RPM.

The vehicle management DB 54 stores the vehicle management information including the vehicle state information, the vehicle diagnosis information, and the vehicle countermeasure information of each management service vehicle. The vehicle state information can be a vehicle year, the RPM, the amount of oil, the time-based average running speed, and the braking distance.

Further, the vehicle management DB 54 stores driver's drive inclination information and season-based vehicle management information.

The input unit 55 is a key input device having a plurality of alphanumeric keys and function keys, and generates the key data on the key pressed by the vehicle expert and outputs the generated key data to the center controller 51.

The display unit 56 displays a variety of information of the service server 50, or displays numerals and characters corresponding to the keys inputted from the input unit 55.

The input unit 55 and the display unit 56 provide a graphic user interface (GUI) with the vehicle expert, and are used as means for allowing the vehicle expert to view the vehicle state information of each management service vehicle stored in the vehicle management DB 54 and input the diagnosis information and the vehicle countermeasure information.

The center controller 51 controls the general operation of the service server 50 and particularly, upon reception of the vehicle state report message through the first data communication unit 57, the center controller 51 detects the vehicle state information from the vehicle state report message, and accumulates and stores the detected vehicle state information in the vehicle management DB 54. If the received vehicle state information is stored in the vehicle management DB 54, the center controller 51 sequentially compares and analyzes the vehicle state information of the vehicle diagnosis DB 53 with the vehicle state information of the vehicle management DB 54 to search for corresponding diagnosis information. When the corresponding diagnosis information is searched, the center controller 51 searches for the vehicle countermeasure information to the corresponding diagnosis information, and stores the searched vehicle countermeasure information in a corresponding area of the vehicle management DB 54. Further, the center controller 51 can also generate the driver's drive inclination information from the information such as the running speed, the number of times of the brake press, and the braking distance of the received vehicle state information, and store the generated inclination information in the vehicle management DB 54. Furthermore, in order to complement the diagnosis information using the vehicle diagnosis DB 53, in the service server 50, the vehicle expert can also cyclically confirm the vehicle state information, the vehicle diagnosis information, and/or the vehicle countermeasure information of each management service vehicle through the input unit 55 and the display unit 56, and receive and store or modify the vehicle diagnosis information and the vehicle countermeasure information.

The second data communication unit 58 connects with the Web server 43 and performs the data communication.

In other words, when the management service vehicle user connects to a Web page of the telematics center 40 to confirm his vehicle information through Internet, the Web server 43 requests the service server 50 for the vehicle management information of the management service vehicle. At this time, the center controller 51 of the service server 50 recognizes the Web server's request through the second communication unit 58, reads the vehicle state information, the vehicle diagnosis information, and the vehicle countermeasure information of the corresponding management service vehicle from the vehicle management DB 54, and transmits the read information to the Web server 43.

Figure 4:
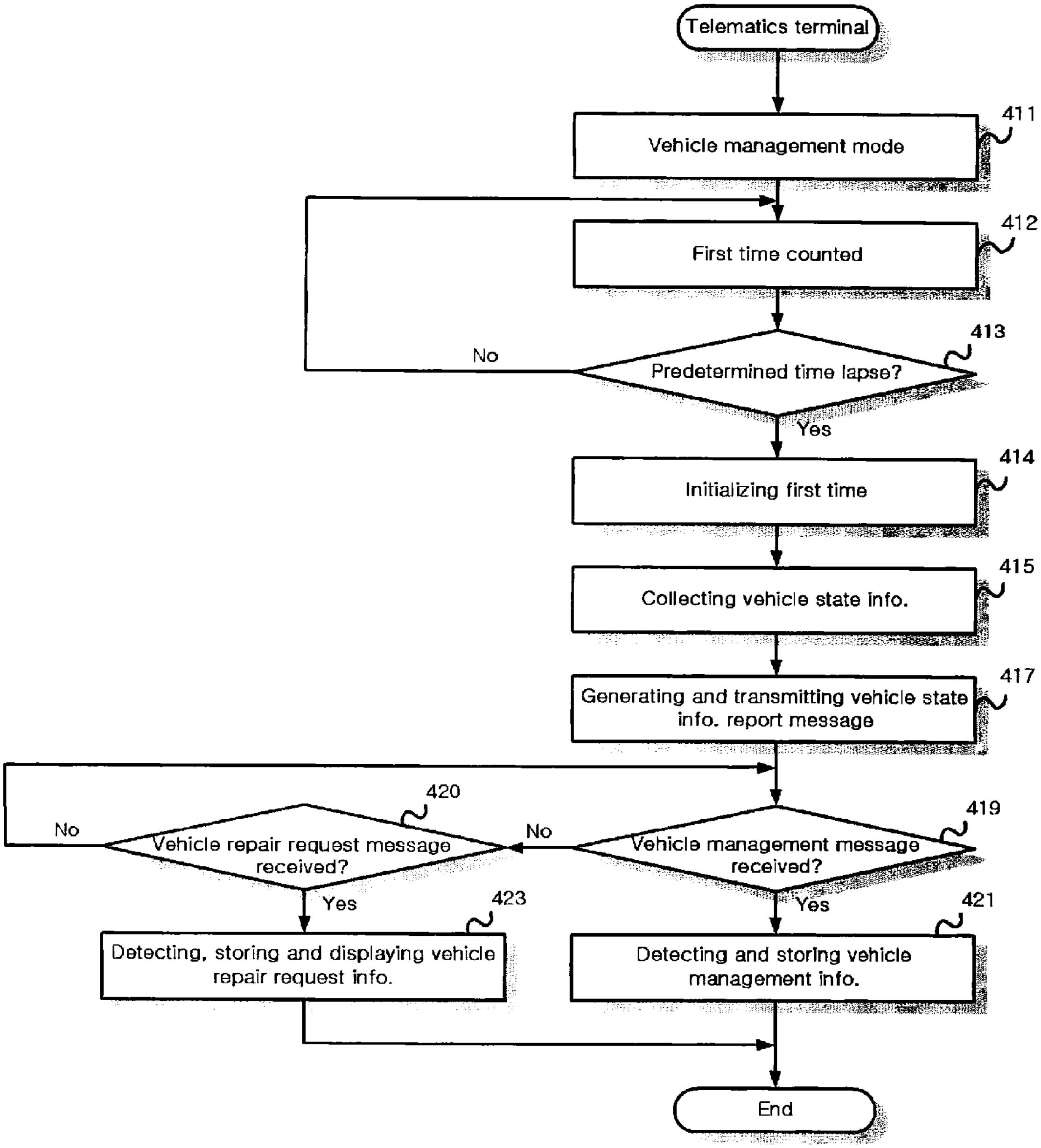
FIG. 4 is a flowchart illustrating a vehicle management method in a telematics terminal of a vehicle management system according to the present invention.

FIG. 4 is a flowchart illustrating a vehicle management method in the telematics terminal of the vehicle management system according to the present invention. A description will be made with reference to FIGS. 1, 2, and 4 below.

First, the telematics controller 11 sets a vehicle management mode in Step 411. The vehicle management mode can be also set by a driver of the management service vehicle through the telematics terminal 10, and can be also set by the service server 50 of the telematics center 40 when the driver requests the telematics center 40 for a vehicle management service and the telematics terminal 10 connects to the telematics center 40.

If the vehicle management mode is set in the Step 411, the telematics controller 10 counts a first time in Step 412, and determines whether or not the counted first time exceeds the first period in Step 413. For one example, if the first period is one day, the telematics controller 10 determines whether or not the counted first time exceeds 24 hours.

If the first time exceeds the first period, the telematics controller 11 initializes the first time in Step 414, and collects the vehicle state information through the vehicle diagnosis unit 20 and stores the collected vehicle state information in the storage unit 12 in Step 415.

After that, the telematics controller 11 generates the vehicle state information report message including the vehicle state information, and transmits the generated report message to the telematics center 40 through the wireless communication unit 15 in Step 417.

Next, the telematics controller 11 sequentially determines whether or not the vehicle management message is received and the vehicle repair request message is received through the wireless communication unit 15 in Steps 419 and 420.

Upon reception of the vehicle management message in the Step 419, the telematics controller 11 detects and stores the vehicle management information, that is, the vehicle state information, the vehicle diagnosis information, and the vehicle measurement information, from the vehicle management message in Step 421.

On the contrary, upon reception of the vehicle repair request message in Step 420, the telematics controller 11 detects the vehicle state information, the vehicle diagnosis information, and the vehicle countermeasure information from the received vehicle repair request message, and stores and displays the detected information on the display unit 14 in Step 423.

FIG. 4 illustrates a case where the vehicle state is measured at each first period, and the measured vehicle state information is transmitted to the telematics center 40, but as described above, after the vehicle state information measured at each first period is accumulated for the second period, the accumulated vehicle state information can be also transmitted.

FIG. 4 illustrates a process of measuring and transmitting the vehicle state information. A method for driver's confirming the stored vehicle state information through the telematics terminal will be described with reference to FIG. 5 below.

Figure 5:
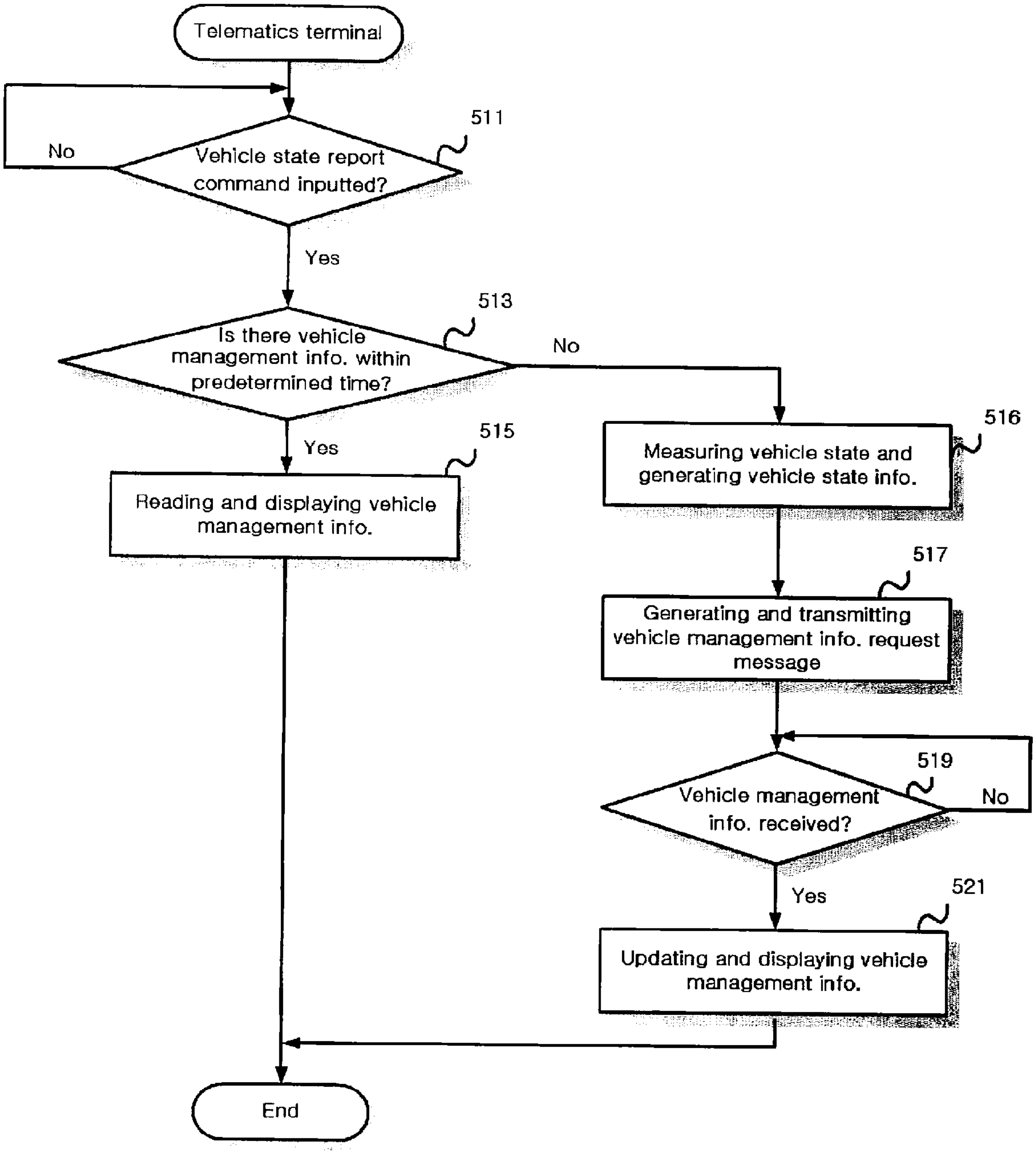
FIG. 5 is a flowchart illustrating a method for displaying vehicle management information requested by a driver in a telematics terminal of a vehicle management system according to the present invention.

FIG. 5 is a flowchart illustrating a method for displaying the vehicle management information requested by the driver in the telematics terminal of the vehicle management system according to the present invention.

The telematics controller 11 determines whether or not the key data corresponding to a vehicle state report command is inputted from the key input unit 13 in Step 511.

If it is determined that the key data corresponding to the vehicle state report command is inputted from the key input unit 13, the telematics controller 11 determines whether or not there exists the vehicle management information within a predetermined period in Step 513. This is to regard the vehicle management information being of long standing over a predetermined period as being seen by the driver or as losing an information value. If it is determined that there exists the vehicle management information within the predetermined period in the Step 513, the telematics controller 11 reads the vehicle management information, that is, the vehicle state information, the vehicle diagnosis information, and the vehicle countermeasure information, from the storage unit 12, and displays the read information on the display unit 14 in Step 515.

On the contrary, if it is determined that there does not exist the vehicle management information within a predetermined period, the telematics controller 11 generates and transmits a vehicle management information request message to the telematics center 40 through the wireless communication unit 15 in Step 517.

After that, the telematics controller 11 determines whether or not the vehicle management information is received from the telematics center 40 in Step 519.

Upon reception of the vehicle management information in the Step 519, the telematics controller 11 updates the vehicle management information stored in the storage unit 12, and displays the updated information on the display unit 14 in Step 521.

As shown in FIG. 5, the vehicle management information can be also received from the telematics center 40 by the management service vehicle user's request, or can be received by a cyclic transmission of the telematics center 40.

In FIGS. 4 and 5, the operations of the telematics terminal 10 are described. Below, FIG. 6 illustrates an operation of the service server 50 of the telematics center 40 performed when the telematics terminal 10 transmits the accumulation vehicle state information at each second period.

Figure 6:
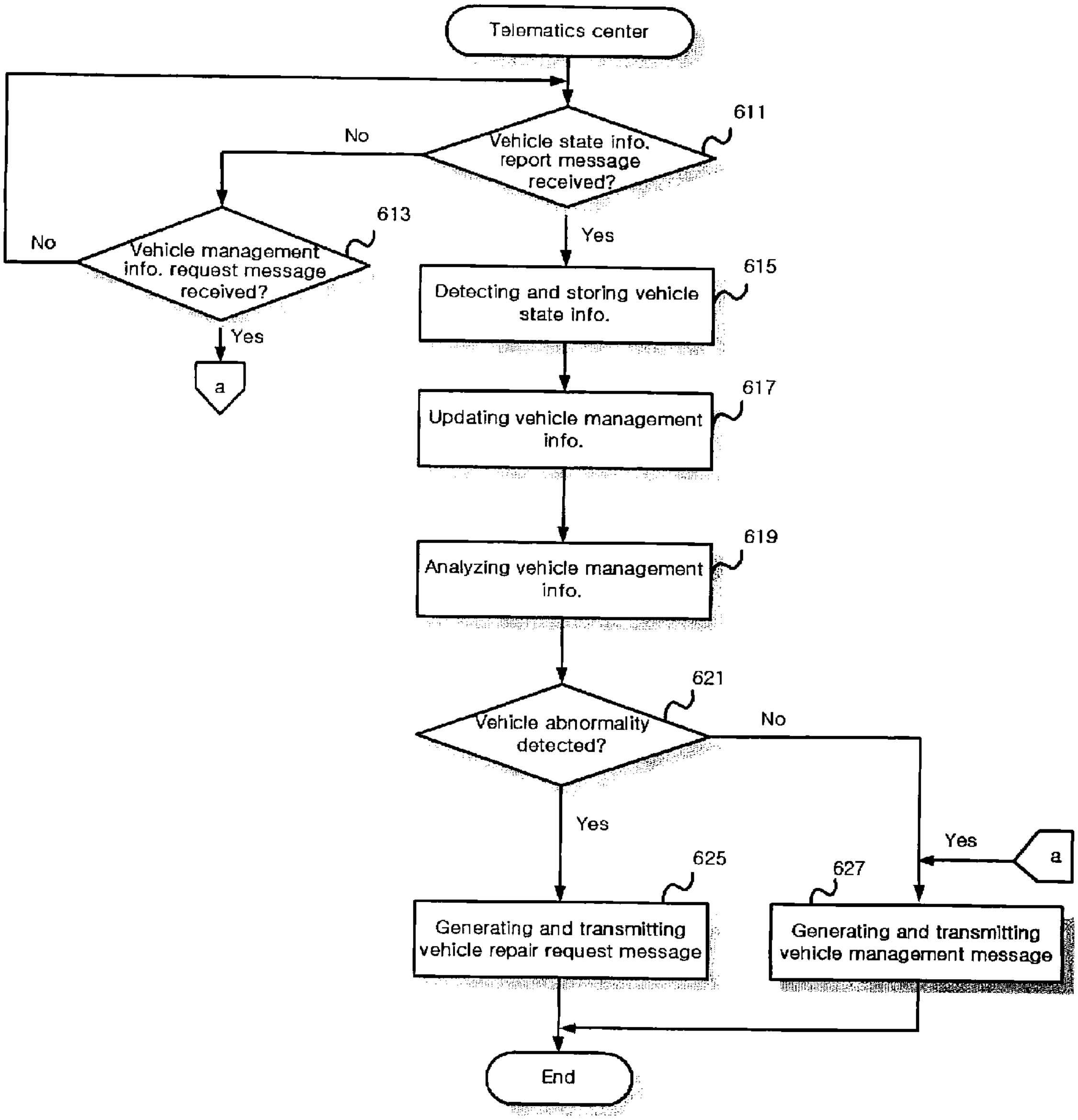
FIG. 6 is a flowchart illustrating a vehicle management method in a telematics center of a vehicle management system according to the present invention.

FIG. 6 is a flowchart illustrating a vehicle management method in the telematics center of the vehicle management system according to the present invention.

The center controller 51 sequentially determines whether or not the vehicle state information report message is received and the vehicle management information request message is received in Steps 611 and 613.

Upon reception of the vehicle state information report message in the Step 611, the center controller 51 detects the vehicle state information from the vehicle state information report message in Step 615, and accumulates and stores the detected vehicle state information in the vehicle management DB 54 in Step 617.

After the Step 617, the center controller 51 detects variation progress values of the vehicle state information at each vehicle part, compares the detected variation progress values with variation progress values of states of a corresponding part of the vehicle diagnosis DB 53, and analyzes the comparison result in Step 619. For example, variation progress values such as 2,500→2,500→2,500→3,000→3,000→3,000→ . . . →3,000 for the RPM of the accumulation vehicle state information are detected at 80 Km speed per hour, and are compared with the diagnosis information for the RPM of the vehicle diagnosis DB 53, and the comparison result is analyzed in the Step 619.

During the analysis of the Step 619, the center controller 51 determines whether or not vehicle abnormality is detected.

If it is determined that the vehicle abnormality is detected in the Step 621, the center controller 51 generates the vehicle repair request message including vehicle repair information on a part whose abnormality is detected, and transmits the generated vehicle repair request message to the corresponding telematics terminal 10 in Step 625.

For example, when the RPM is increased from 2,500 RPM to 3,000 RPM in variation progress as exemplified above, in the Step 621, the center controller 51 inserts the diagnosis information such as the engine check or engine coil check into the vehicle repair request message, and transmits the vehicle repair request message having the diagnosis information to the corresponding telematics terminal 10. In order to prevent erroneous diagnosis caused by a temporary variation of the RPM, the center controller 51 checks the RPM variation progress as above, and performs the diagnosis when the RPM variation progress is maintained more than a predetermined number of times.

On the contrary, when the vehicle abnormality is not detected in the Step 621, the center controller 51 generates and stores the vehicle management information including information such as the driver's drive inclination information and the season-based vehicle management information, and generates and transmits the vehicle management message including the vehicle management information, to the corresponding telematics terminal 10.

If the vehicle management information request message is received in the Step 613, the center controller 51 generates and transmits the vehicle management message including the previously stored vehicle management information, to the telematics terminal 10.

FIG. 6 illustrates a case where the telematics terminal 10 accumulates the vehicle state information at each second period. In case where the telematics terminal 10 transmits the vehicle state information at each first period, that is, at each one day, the center controller 10 can also accumulate the received vehicle state information for the second period, and provide the vehicle management information to the telematics terminal 10 in the Steps subsequent to the Step 619.

Further, FIG. 6 illustrates the case of using the vehicle diagnosis DB 53, but the vehicle expert can also view the vehicle state information recorded in the vehicle management DB 54 while directly inputting the diagnosis information at a cycle of a predetermined period through the input unit 55 and the display unit 56 of FIG. 3 to generate the vehicle management information. In such a case, when the vehicle expert records or updates the vehicle management information, the center controller 51 can generate and transmit the vehicle management message including the vehicle management information to the corresponding telematics terminal 10.

As described above, the present invention has an advantage in that the vehicle diagnosis can be not only performed using the sensor installed at each vehicle part, but also a more detailed vehicle diagnosis can be performed using the accumulated information on the states of each vehicle part.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A vehicle management system in a telematics system connected with a personal communication terminal through an Internet network, the vehicle management system comprising:

a telematics terminal for measuring a vehicle state at each first period, accumulating and storing the measured vehicle state during a second period, and transmitting accumulated and stored accumulation vehicle state information; and a telematics center having a vehicle diagnosis database for storing diagnosis information on states of each vehicle part, and connected with the telematics terminal through a mobile communication network, and receiving the accumulation vehicle state information from the telematics terminal, storing the received accumulation vehicle state information, checking a variation progress of state values of each vehicle part of the received accumulation vehicle state information and searching for corresponding diagnosis information with reference to the vehicle diagnosis database, and generating and transmitting vehicle management information to the telematics terminal, wherein the telematics center comprises:

a service server having the vehicle diagnosis database for storing the diagnosis information on the states of each vehicle part, and receiving and storing the accumulation vehicle state information, checking the variation progress of the state values of each vehicle part of the received accumulation vehicle state information and searching for the corresponding diagnosis information with reference to the vehicle diagnosis database, and generating and transmitting the vehicle management information to the telematics terminak and a Web server for providing the vehicle management information to a telematics terminal user who connects to a Web site of the telematics center through the personal communication terminal, wherein the service server comprises:

a vehicle management database for storing the accumulation vehicle state information and the vehicle management information;

the vehicle diagnosis database for storing the diagnosis information on various states of each vehicle part and countermeasure information to the diagnosis information;

a first data communication unit for performing a data communication with the telematics terminal through the mobile communication network; and a center controller for receiving the accumulation vehicle state information through the first data communication unit, storing the received vehicle state information in the vehicle management database, checking the variation progress of the state values of each vehicle part of the received vehicle state information and searching for the corresponding diagnosis information with reference to the vehicle diagnosis database, and generating and transmitting the vehicle management information to the telematics terminal.

2. The system according to claim 1, wherein the telematics terminal comprises:

a brake driver for detecting a brake press, and generating a brake press signal;

a vehicle diagnosis unit connected with the brake driver and a sensor of each vehicle part, and measuring the vehicle state and generating the vehicle state information;

a storage unit for storing the vehicle state information and vehicle repair information;

a wireless communication unit for performing a wireless data communication with the telematics center under predetermined control; and a telematics controller for measuring the vehicle state through the vehicle diagnosis unit at each first period, accumulating and storing the measured vehicle state in the storage unit during the second period, and transmitting accumulated and stored accumulation vehicle state information through the wireless communication unit.

3. The system according to claim 2, wherein the vehicle diagnosis unit calculates a braking distance by the brake press signal inputted from the braking driver.

4. The system according to claim 3, wherein the vehicle state information comprises a RPM (revolution per minute), the braking distance, and a time-based average running speed.

5. The system according to claim 4, wherein the first period is one day.

6. The system according to claim 4, wherein the second period is one month.

7. The system according to claim 5, wherein the second period is one month.

8. The system according to claim 1, wherein the vehicle diagnosis database further comprises season-based vehicle management information, and when a season is changed, season vehicle management information of a corresponding season is further included in a vehicle management information message and is transmitted to the telematics terminal.

9. The system according to claim 8, wherein the service server further comprises:

an input tin it for inputting a character and a numeral; and a display unit for displaying the vehicle state information and the inputted numeral and character, and receives the diagnosis information on the accumulation vehicle state information from a vehicle expert, and generates the vehicle management information.

10. A vehicle management system in a telematics system connected with a personal communication terminal through an Internet network, the vehicle management system comprising:

a telematics terminal for measuring and storing a vehicle state at each first period, transmitting stored vehicle state information, and receiving and displaying predetermined vehicle management information; and a telematics center having a vehicle diagnosis database for storing diagnosis information on states of each vehicle part, and connected with the telematics terminal through a mobile communication network, and receiving the vehicle state information at each first period from the telematics terminal, accumulating and storing the received vehicle state information during a second period, checking a variation progress of state values of each vehicle part of the received vehicle state information and searching for corresponding diagnosis information with reference to the vehicle diagnosis database, and generating and transmitting vehicle management information to the telematics terminal, wherein the telematics center comprises:

a service server having the vehicle diagnosis database for storing the diagnosis information on the states of each vehicle pail, and receiving the vehicle state information at each first period, accumulating and storing the received vehicle state information during the second period, checking the variation progress of the state values of each vehicle pail of the accumulation vehicle state information and searching for the corresponding diagnosis information with reference to the vehicle diagnosis database, and generating and transmitting the vehicle management information to the telematics terminal; and a Web server for providing the vehicle management information to a telematics terminal user who connects to a Web site of the telematics center through the personal communication terminal, wherein the service server comprises:

a vehicle management database for storing the accumulation vehicle state information and the vehicle management information;

the vehicle diagnosis database for storing the diagnosis information on various states of each vehicle part and countermeasure information to the diagnosis information;

a first data communication unit for performing a data communication with the telematics terminal through the mobile communication network; and a center controller for receiving the accumulation vehicle state information through the first data communication unit, storing the received accumulation vehicle state information in the vehicle management database, accumulating the vehicle state information received at each first period, checking the variation progress of the state values of each vehicle part of the received vehicle state information and searching for the corresponding diagnosis information with reference to the vehicle diagnosis database, and generating and transmitting the vehicle management information to the telernatics terminal.

11. The system according to claim 10, wherein the telematics terminal comprises:

a brake driver for detecting a brake press, and generating a brake press signal;

a vehicle diagnosis unit connected with the brake driver and a sensor of each vehicle part, and measuring the vehicle state and generating the vehicle state information;

a storage unit for storing the vehicle state information and vehicle repair information;

a wireless communication unit for performing a wireless data communication with the telematics center under predetermined control; and a telematics controller for measuring and storing the vehicle state through the vehicle diagnosis unit at each first period, and transmitting the stored vehicle state information through the wireless communication unit.

12. The system according to claim 11, wherein the vehicle diagnosis unit calculates a braking distance by the brake press signal inputted from the braking driver.

13. The system according to claim 12, wherein the vehicle state information comprises a RPM (revolution per minute), the braking distance, and a time-based average running speed.

14. The system according to claim 13, wherein the first period is one day.

15. The system according to claim 13, wherein the second period is one month.

16. The system according to claim 14, wherein the second period is one month

17. The system according to claim 10, wherein the vehicle diagnosis database further comprises season-based vehicle management information. and when a season is changed, season vehicle management information of a corresponding season is further included in a vehicle management information message and is transmitted to the telematics terminal.

18. The system according to claim 17, wherein the service server further comprises:

an input unit for inputting a character and a numeral: and a display unit for displaying the vehicle state information and the inputted numeral and character, and receives the diagnosis information on the accumulation vehicle state information from a vehicle expert, and generates the vehicle management information.

19. A vehicle management method in a telematics system having a telematics terminal, a telematics center connected with the telematics terminal through a mobile communication network and having a vehicle diagnosis database for storing diagnosis information on states of each vehicle part, and a personal communication terminal connected with the telematics terminal through an Internet network, the method comprising:

a first step of, in the telematics terminal, measuring a vehicle state at each first period, accumulating and storing the measured vehicle state during a second period, and transmitting accumulated and stored accumulation vehicle state information;

a second step of, in the telematics center connected with the telematics terminal through a mobile communication network, receiving the accumulation vehicle state information from the telematics terminal, storing the received accumulation vehicle state information, checking a variation progress of state values of each vehicle part of the received accumulation vehicle state information and searching for corresponding diagnosis information with reference to the vehicle diagnosis database, and generating and transmitting vehicle management information to the telematics terminal; and a third step of, in the telematics terminal, receiving and displaying the vehicle management information, wherein the second step comprising the steps of:

determining whether or not the accumulation vehicle state information is received;

upon reception of the accumulation vehicle state information, checking the variation progress of the states of each vehicle part of the received accumulation vehicle state information and searching for corresponding diagnosis information and countermeasure information with reference to the vehicle diagnosis database, and generating the vehicle management information; and transmitting the vehicle management information to the telematics terminal.

20. The method according to claim 19, wherein the first step comprising the steps of:

measuring and storing the vehicle state at each first period;

performing the measuring and storing, and accumulating and storing the vehicle state information during the second period; and transmitting the accumulation vehicle state information accumulated for the second period, to the telematics center.

* * * * *